M. H. AVERY.
PULLEY AND BEARING THEREFOR.
APPLICATION FILED NOV. 2, 1910.
1,003,864.
Patented Sept. 19, 1911.
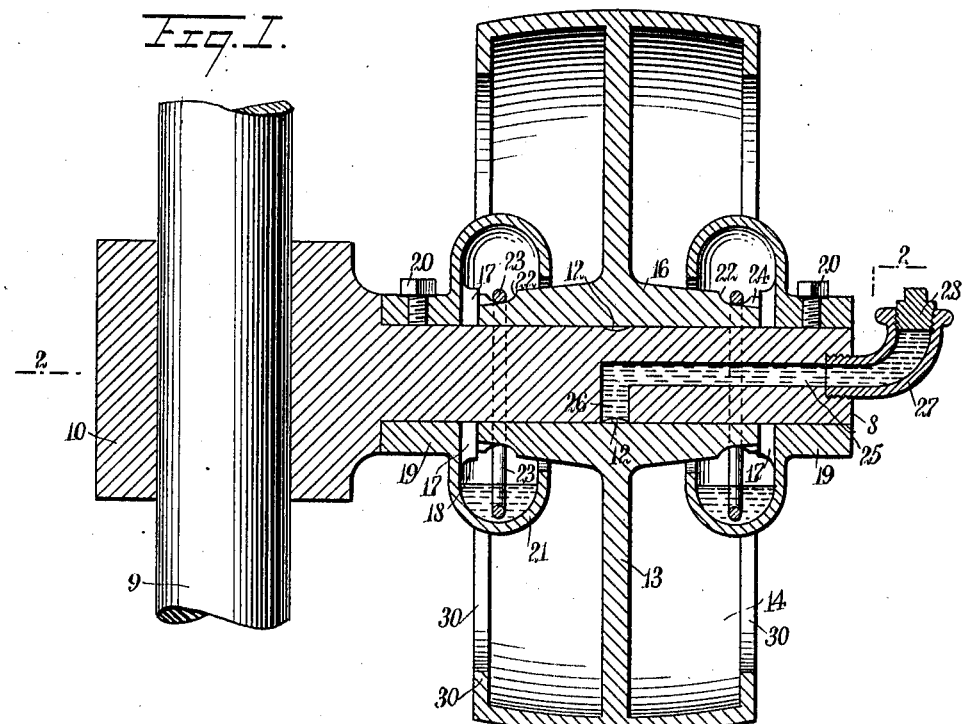
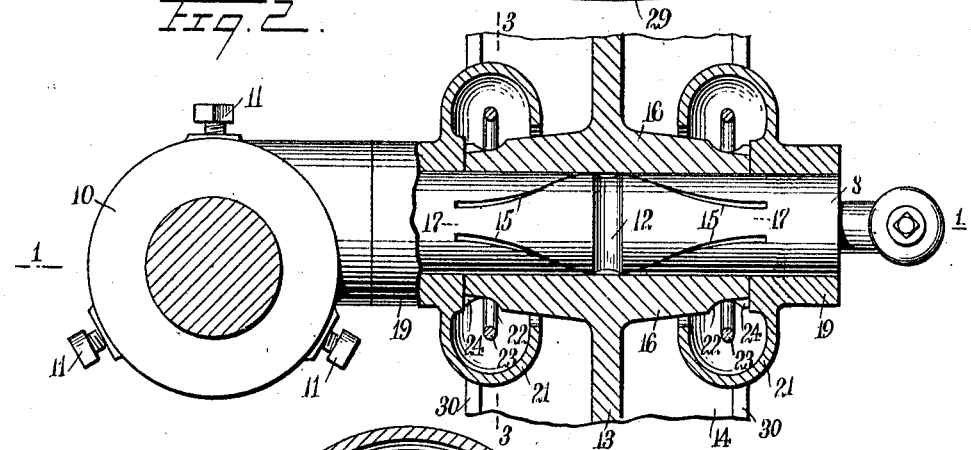
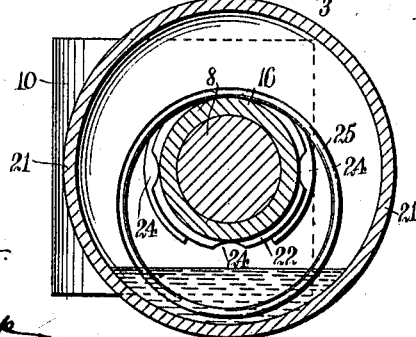
WITNESSES:
INVENTOR
Morris Harrison Avery
BY
ATTORNEYS

UNITED STATES PATENT OFFICE.

MORRIS HARRISON AVERY, OF DOVER, NEW HAMPSHIRE.

PULLEY AND BEARING THEREFOR.

1,003,864.  Specification of Letters Patent.  Patented Sept. 19, 1911.

Application filed November 2, 1910. Serial No. 590,331.

*To all whom it may concern:*

Be it known that I, MORRIS HARRISON AVERY, a citizen of the United States, and a resident of Dover, in the county of Stafford and State of New Hampshire, have invented a new and Improved Pulley and Bearing Therefor, of which the following is a full, clear, and exact description.

Among the principal objects which the present invention has in view are: to provide oiling devices for pulleys arranged for continuous circulation of oil from the center to the end of the bearings and return; to provide a construction for pulleys whereby is avoided dropping of oil from the pulley or bearing therefor; and to provide an oil distributing and lubricating stationary bearing for a loose pulley.

One embodiment of the present invention is disclosed in the structure illustrated in the accompanying drawings, in which like characters of reference denote corresponding parts in all the views, and in which—

Figure 1 is a vertical section of a pulley and mounting therefor, constructed and arranged in accordance with the present invention; Fig. 2 is a cross section taken on the line 2—2 in Fig. 1; and Fig. 3 is a detail view, on an enlarged scale and in vertical section, taken on the line 3—3 in Fig. 2.

The pulleys, when constructed and arranged in accordance with the present invention and as illustrated in the accompanying drawings, are preferably mounted upon stationary stud shafts 8. In the present drawings the stud shaft 8 is illustrated as being mounted upon a standard 9, to receive which the said stud shaft 8 is provided with a bearing boss 10. The boss 10 is held in adjusted position on the standard 9 by means of set screws 11, 11. This construction is peculiarly adapted to the mounting for guide pulleys employed by me in an invention entitled Power transmission mechanism, for which I have made application for patent, Serial No. 569,668, said application being filed June 30, 1910, to which cross reference is here made.

The shaft 8 is provided with a central groove 12. The groove 12 is disposed in line with the spokes or central web 13 of the pulley 14. Radiated from the groove 12 are spiral grooves 15, 15. The grooves 15, 15 are extended beyond the ends of the hub 16 of the pulley 14, thereby insuring the lubrication of the entire bearing of the hub. The grooves 15, 15 are oppositely pitched, whereby the oil is carried in one set of grooves from the groove 12 outward therefrom and to the ends of the bearing for the hub 16. The other set of grooves is so disposed that the track of the lubricant therein carries the oil back from the outer extremes of the said grooves to the center groove 12. The oil which is carried by the second set of grooves toward the center of the bearing is received from vertical grooves 17, 17 formed in the end thrust bosses 18, 18 provided on the collars 19, 19. The collars 19, 19 are fixed by means of set screws 20, 20 on the shaft 8. The oil wiped from the ends of the hub 16 into the lower extension of the grooves 17 is received in the lower section of the curved flange 21.

The hub 16 of the pulley 14 is provided near each end thereof with an annular groove 22 which supports in guided relation a loose ring 23. The friction of the ring 23 upon the hub 16 causes the same to rotate. The diameters of the ring and hub differentiating, as shown in the drawings, the rate of rotation of the said ring varies in proportion to the difference between the diameters of the said ring and the end of the hub by which it is supported. The rotation of the ring being proportionately slow, and the lower section thereof extending into the lower section of the chamber formed by the flange 21 lifts the oil from the said flange 21. The oil is deposited by the said ring on the upper surface of the hub 16 to be delivered to the upper section of the groove 17. It is to deliver the oil from the groove 22 that I have provided the short longitudinal cuttings 24 at intervals in the side of the groove 22, the bottom of the cutting being slightly declined toward the outer end of the hub 16. The accumulated lubricant in the upper extension of the groove 17 is caught by the partially emptied grooves 15, 15 which grooves are those inclined backward from the rotary direction toward the center groove 12 of the shaft 8. The other grooves pitched backward from the line of rotary direction toward the outer end of the bearing are normally filled with lubricant and therefore unable to extract the oil from the upper section of the groove 17.

The shaft 8 is pierced with a longitudinal boring 25. At the center of the said boring, and in line with the groove 12, the shaft is provided with a short transverse boring 26, extended downward to deliver the lubricant from the borings 25 and 26 to the groove 12. At the outer end the boring 25 is enlarged and tapped to receive the screw threaded end of the lubricant receptacle 27. The receptacle 27 is shown in the drawings as being a pipe elbow, having at the upper end thereof a screw plug 28. It will be understood that the elbow and plug may be substituted for any approved and well known form of lubricant receptacle or box.

The pulley 14, is shown in the accompanying drawings as having a crown face 29. The face of this pulley may be of any desired shape. At the outer edges of the face of the pulley there are formed inturned flanges 30, 30. The flanges 30, 30 are solid and form on the inner face of the pulley a pocket to receive and hold any lubricant which may drop from the bearing above described. It is to provide for the contingency of overflow oil from the flanges 21, 21 that the peak of the flanges 21, 21 are extended inward to rest within the flanges 30, 30. If any oil should overflow from the flanges 21, in dropping it would fall between the web 13 and the flange 30 on the pulley, to be there held until wiped therefrom by the attendant in charge.

Having thus described my invention, what I claim as new and desire to secure by Letters Patent is:—

1. A pulley and bearing therefor, comprising a shaft having formed therein a plurality of longitudinally disposed angularly arranged grooves, certain of said grooves being inclined from the line of rotary direction backward toward the center, and others of said grooves being inclined from said rotary direction backward toward the extremes of said bearing; means for delivering lubricant to the said grooves at the center of said bearing; a lubricant chamber fixedly mounted on said shaft at the extremes thereof to receive said lubricant when delivered thereto by said grooves; and elevating rings mounted on the rotary member on said bearing adapted to lift the lubricant from said chamber to redistribute the same above the bearing to the said grooves.

2. A pulley and bearing therefor, comprising a stationary shaft having formed therein grooves longitudinally disposed and angularly arranged, extending from the center of said bearing to the extremes thereof, certain of said grooves being inclined in one transverse direction from the median line of said shaft, and others of said grooves being inclined in a direction opposite to the inclination of the first mentioned grooves; means for delivering lubricant to said grooves at the center of said bearing; a pulley mounted upon said shaft to surround said grooves, bearing collars fixedly mounted on said shaft to hold the said pulley in position thereon, said collars being provided with flanges adapted to infold the ends of the hub of said pulley to form an oil receiving chamber at the ends of said bearing; and a plurality of oiling rings mounted on the hub of said pulley adapted to lift the oil from the lower portion of said flanges to deposit the same upon said hub above the said shaft.

3. A pulley and bearing therefor, comprising a stationary shaft having formed therein grooves longitudinally disposed and angularly arranged, extending from the center of said bearing to the extremes thereof, certain of said grooves being inclined in one transverse direction from the median line of said shaft, and others of said grooves being inclined in a direction opposite to the inclination of the first mentioned grooves; means for delivering lubricant to said grooves at the center of said bearing; a pulley mounted upon said shaft to surround said grooves; bearing collars fixedly mounted on said shaft provided with bearing bosses for the hub of said pulley, said bosses being provided with perpendicularly arranged grooves for the transmission of oil from said grooves formed in said shaft, and said collars being provided with flanges adapted to infold the ends of the hub of said pulley to form an oil receiving chamber at the ends of said bearing; and a plurality of oiling rings supported on the hub of said pulley adapted to lift the oil from the lower portion of said chamber to deliver the same to the upper extension of said vertically disposed grooves in said bosses.

4. A pulley and bearing therefor, comprising a stationary shaft having formed therein grooves longitudinally disposed and angularly arranged, extending from the center of said bearing to the extremes thereof, certain of said grooves being inclined in one transverse direction from the median line of said shaft, and others of said grooves being inclined in a direction opposite to the inclination of the first mentioned grooves; means for delivering lubricant to said grooves at the center of said bearing; a pulley mounted upon said shaft to surround said grooves; bearing collars fixedly mounted on said shaft provided with bearing bosses for the hub of said pulley, said bosses being provided with perpendicularly arranged grooves for the transmission of oil from said grooves formed in said shaft, and said collars being provided with flanges adapted to infold the ends of the hub of said pulley to form an oil receiving chamber at the ends of said bearing; a hub for said pulleys having formed therein, and near the outer ends thereof, annular grooves extended within the oiling chamber formed by said flanges; and a plurality of oiling rings supported in said grooves formed on said hub.

5. A pulley and bearing therefor, comprising a stationary shaft having formed therein grooves longitudinally disposed and angularly arranged, extending from the center of said bearing to the extremes thereof, certain of said grooves being inclined in one transverse direction from the median line of said shaft, and others of said grooves being inclined in a direction opposite to the inclination of the first mentioned grooves; means for delivering lubricant to said grooves at the center of said bearing; a pulley mounted upon said shaft to surround said grooves; bearing collars fixedly mounted on said shaft provided with bearing bosses for the hub of said pulley, said bosses being provided with perpendicularly arranged grooves for the transmission of oil from said grooves formed in said shaft, and said collars being provided with flanges adapted to infold the ends of the hub of said pulley to form an oil receiving chamber at the ends of said bearing; a hub for said pulley having formed therein and near the outer ends thereof annular grooves adapted to be extended within the oiling chamber formed by said flanges; a plurality of longitudinally disposed grooves radiating from said annular grooves toward the ends of said hub to deliver the oil from said annular grooves to said perpendicularly disposed grooves formed in said bosses; and a plurality of oiling rings disposed in each of the said annular grooves to lift the oil from the said chamber to the upper side of said annular grooves and said hub.

In testimony whereof I have signed this specification in the presence of two subscribing witnesses.

MORRIS HARRISON AVERY.

Witnesses:
ALMIE M. JENNESS,
DWIGHT HALL.

---

Copies of this patent may be obtained for five cents each, by addressing the "Commissioner of Patents Washington, D. C."